United States Patent Office 2,962,503
Patented Nov. 29, 1960

2,962,503
NITROPYRROLES

Coy W. Waller, Nanuet, N.Y., Martin J. Weiss, Oradell, and John S. Webb, Woodcliff Lake, N.J., assignors to American Cyanamid Company, New York, N.Y., a corporation of Delaware No Drawing. Filed Nov. 21, 1956, Ser. No. 623,558

9 Claims. (Cl. 260—326.3)

This invention relates to new organic compounds. More particularly, it relates to substituted nitropyrroles and their preparation.

For many years a study of pyrrole chemistry has been carried out by numerous investigators because of the presence of this heterocyclic nucleus in the structure of hemoglobin and chlorophyll. During the course of this work many pyrrole compounds have been described bearing various substituents. However, the present compounds, 1-lower-alkyl-4-nitro-2-carbamoyl pyrroles, have not been described.

The compounds of the present invention may be illustrated by the following structural formula:

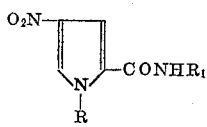

in which R is a lower alkyl radical and $R_1$ is hydrogen, 2-carbamoyl-pyrrol-4-yl, carbamoylphenyl, omega-amino lower alkyl, carboxy lower alkyl, carbamoyl lower alkyl, and carboloweralkoxy lower alkyl radicals.

The compounds of the present invention are, in general, crystalline solids. They have relatively high melting points and are soluble to some extent in the usual organic solvents, for example, alcohol, dimethylformamide, or pyridine. The substituent groups will obviously effect the solubility of the various substances.

The present application is a continuation-in-part of our copending application Serial No. 424,261, filed April 19, 1954 now abandoned.

These compounds can be prepared by different methods. However, we prefer to use as starting material the 1-alkyl-4-nitro-2-pyrrolecarboxylic acids or derivatives thereof. These starting materials are then reacted with amino acids, aminoheterocyclic carboxylic acids, etc. to produce compounds in which $R_1$ of the general formula is derived from, for example, beta-alanine, 4-amino-1-methyl-2-pyrrolecarboxylic acid, ethyl 4-amino-1-methyl-2-pyrrolecarboxylate, N-[1-methyl-4-amino-2-pyrrolylcarbonyl]-beta-alanine, beta-[4-amino-1-methyl-2-pyrrolylcarboxamido]-propionamide, and the like.

We have found that the nitro compounds of the present invention are useful as intermediates for the preparation of compounds of the following structure, which have antibacterial properties:

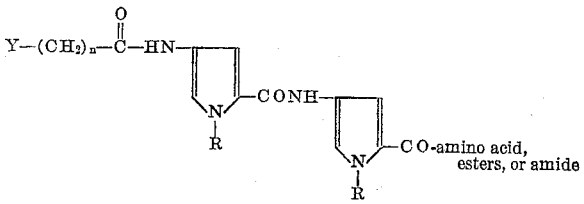

in which Y is an amino or substituted amino radical and $n$ is a small whole integer; for example, the compound beta-[1-methyl-4-(4-guanidino acetamido-1-methyl-2-pyrrolecarboxamido)-2-pyrrolecarboxamido]-propionamide has antibacterial activity against a number of gram-positive and gram-negative bacteria. This compound is described and claimed in our copending application, Serial No. 424,263, filed April 19, 1954 now U.S. Patent No. 2,785,182. The compounds of the present invention also exhibit local anesthetic and analgesic activity. The following table shows the results of testing a number of the compounds for analgesic activity:

TABLE [1]

| Compound | Dosage (n.mol./kg.) | Percent of Animals Tested Showing Analgesia |
|---|---|---|
| N-(1-Methyl-4-nitro-2-pyrrolylcarbonyl)-beta-alanine | 0.4 | 70 |
| Beta-[1-Methyl-4-(1-methyl-4-nitro-2-pyrrolecarboxamido)-2-pyrrolecarboxamido]-propionamide | 0.8 | 70 |
| N-[4-(1-Methyl-4-nitro-2-pyrrolylcarbonyl)-aminobenzoyl]-beta-alanine | 0.4 | 60 |
| Beta-(1-Methyl-4-nitro-2-pyrrolecarboxamido)-propionamide | 0.8 | 90 |
| 4-[Beta-(1-methyl-4-nitro-2-pyrrolecarboxamido)propionamido]-1-methyl-2-pyrrolecarboxamide | 0.4 | 80 |

[1] The test is a modified Wolff-Hardy method, utilizing a heat stimulus applied to the rat tail. In evaluating the analgesic activity, the criteria of analgesia is that described in "Experimental Laboratory Methods for Studying Analgesics," H. S. Kupperman, Journal of the American Geriatrics Society 4, 193–201 (1956).

These properties make them useful as therapeutics in humans or domestic animals for the relief of pain when administered orally or parenterally. When administered orally, they can be in the form of pills, tablets, capsules, or powders. For parenteral use, they can be given in isotonic solutions or mixed with other solutions prepared for injection.

The following examples illustrate the preparation of representative substituted nitropyrroles of the present invention:

EXAMPLE 1

*Ethyl 1-methyl-4-(1-methyl-4-nitro-2-pyrrolycarbonyl)-amino-2-pyrrolecarboxylate*

Sodium methylate (140 parts) is dissolved in ethanol (1120 parts), the solution is cooled to 25° C., ethyl 4-nitro-2-pyrrolecarboxylate (402 parts) is added, and then methyl iodide (1070 parts) is added. Within a short time, heat is evolved, and it is necessary to periodically cool the solution in an ice bath to keep the temperature below 40° C. Crystalline solids begin to precipitate, and the reaction mixture is allowed to sit overnight at room temperature. After chilling and filtering, the collected solids are washed thoroughly with water to remove much of the color. After drying to constant weight in the oven at 55° C., 384 parts (89%) of ethyl 1-methyl-4-nitro-2-pyrrolecarboxylate is obtained as light-tan colored platelets, melting at 108°–112° C. Several re-crystallizations from ethanol and treatment with activated charcoal give white platelets, melting at 113.2°–114.2° C. Additional crude material may be obtained by diluting the original mother liquor with water.

To a hot solution of sodium hydroxide (200 parts) in water (800 parts) a suspension of ethyl 1-methyl-4-nitro-2-pyrrolecarboxylate (364 parts) in hot ethanol (640 parts) is added. The yellow solid which forms is dissolved by heating the solvent to reflux and adding water (200 parts). Refluxing is continued for four and one-half hours. After then standing overnight at room temperature, coarse yellow crystals form. These are dissolved by the addition of hot water (2000 parts), and then this solution is acidified with excess 6N hydrochloric acid. The suspension is chilled, and the crystalline solids are filtered. After drying in the oven at 55° C. to constant weight, 257 parts (82%) of 1-methyl-4-nitro-2-pyrrolecarboxylic acid, melting point 194°–197° C., is obtained.

1-methyl-4-nitro-2-pyrrolecarboxylic acid (5.0 parts) is hydrogenated with 10% palladium-carbon catalyst (1.5 parts) in ethanol (100 parts) in the Parr low pressure hydrogenation apparatus. The hydrogen uptake is rapid. The hydrogenation flask is flushed with nitrogen, and the catalyst is filtered in a nitrogen atmosphere. Concentrated sulfuric acid, 1 part, is then added dropwise to the chilled filtrate. This gives a white crystalline material which is filtered and air dried to yield 2.5 parts of 4-amino - 1 - methyl - 2 - pyrrolecarboxylic acid.½$H_2SO_4$, melting at 165°–167° C. A sample of the sulfate salt is purified by two recrystallizations from ethanol-water and once from hot water to give, after drying under reduced pressure over phosphorus pentoxide at room temperature, the hemihydrate, melting at 196°–197° C.

In a suitable reaction vessel ethyl 4-amino-1-methyl-2-pyrrolecarboxylate.½$H_2SO_4$.¾$H_2O$ (32 parts) is suspended in water (250 parts), excess sodium bicarbonate (38 parts) is added portionwise, and the liberated free amine is dissolved in benzene (160 parts). The two phases are stirred vigorously as a benzene (160 parts) solution of 1-methyl-4-nitro-2-pyrrolecarboxylic acid chloride, prepared from the corresponding acid (28 parts) is added. A yellow solid forms immediately. Stirring is continued for thirty minutes. Then the precipitate is filtered and washed with water and acetone. After drying in the oven at 55° C. to constant weight, the yield of ethyl 1 - methyl-4 - (1 - methyl-4-nitro-2-pyrrolylcarbonyl)-amino-2-pyrrolecarboxylate as a crystalline, light-yellow, fiber-like material is 26 parts. The benzene phase of the mother liquor is separated and allowed to evaporate to give 4.3 parts of residual solids, which after recrystallization from pyridine give 2.0 parts of additional dipeptide. Total yield is 28 parts (63%).

Acidification of the bicarbonate phase gives 7.3 parts (25%) of recovered 1-methyl-4-nitro-2-pyrrolecarboxylic acid.

The dipeptide is purified by recrystallization from pyridine to give material melting at 228.0°–228.5° C.

EXAMPLE 2

*N-(1-methyl-4-nitro-2-pyrrolylcarbonyl)-beta-alanine*

A benzene (60 parts) solution of 1-methyl-4-nitro-2-pyrrolecarboxylic acid chloride, prepared from 15.3 parts of the corresponding acid, is added to a stirred solution of beta-alanine (13.5 parts) and sodium bicarbonate (20.7 parts) in water (75 parts). Carbon dioxide is evolved, and the two phases are vigorously stirred overnight. The aqueous layer is separated, chilled in an ice bath, and acidified to Congo Red with dilute sulfuric acid. The precipitated cream-colored crystalline solids are filtered, washed well with water, and air dried to give 17.5 parts (78%) of N-(1-methyl-4-nitro-2-pyrrolylcarbonyl)-beta-alanine. This crude dipeptide is purified by dissolving in 160 parts of hot ethanol, filtering, concentrating to about 70 parts by volume, chilling, and filtering to give 11.4 parts of product, melting at 180°–183° C. Repeated recrystallizations from ethanol give lustrous white clusters, but do not raise the melting point.

EXAMPLE 3

*N-[1-methyl-4(1-methyl-4-nitro-2-pyrrolylcarbonyl)-amino-2-pyrrolylcarbonyl]-beta-alanine*

A solution of N-(1-methyl-4-nitro-2-pyrrolylcarbonyl)-beta-alanine (10 parts) in 0.1N aqueous sodium hydroxide solution (40 parts) is hydrogenated in a Parr low pressure apparatus with 10% palladium on carbon (4 parts) as catalyst. The hydrogen uptake is rapid and essentially quantitative. The catalyst is filtered to give an aqueous solution of the sodium salt of N-(4-amino-1-methyl-2-pyrrolylcarbonyl)-beta-alanine, which may be used directly for the preparation of peptides. If desired, the salt may be isolated by evaporation of the solvent.

Sodium bicarbonate (6.9 parts) is added to the aqueous solution of the sodium salt of N-(4-amino-1-methyl-2-pyrrolylcarbonyl)-beta-alanine, prepared above. The solution is stirred vigorously, and a benzene (80 parts) solution of 1-methyl-4-nitro-2-pyrrolecarboxylic acid chloride, prepared from 6.8 parts of the acid, is added. Within a short time, a yellow solid forms, and stirring is continued at room temperature overnight. Water (250 parts) is added to dissolve the precipitated tripeptide sodium salt. The aqueous layer is separated and acidified to Congo Red test paper with dilute sulfuric acid to give a yellow crystalline solid. The crystals are filtered, washed with water, and dried in air to give 15.0 parts of crude N - [1 - methyl - 4 - (1-methyl-4-nitro-2-pyrrolylcarbonyl)-amino-2-pyrrolylcarbonyl]-beta-alanine. Recrystallization from dimethylformamide-water mixture gives 8.5 parts (57%), melting at 249°–251° C. with decomposition. Several additional recrystallizations from dimethylformamide-water give bright orange clusters, melting at 250°–251° C.

EXAMPLE 4

*Beta-[1-methyl-4-(1-methyl-4-nitro-2-pyrrolecarboxamido)-2-pyrrolecarboxamido]propionamide*

N - [1 - methyl - 4 - (1 - methyl - 4 nitro - 2 - pyrrolylcarbonyl) - amino - 2 - pyrrolylcarbonyl] - beta - alanine (2 parts) is dissolved in dimethylformamide (12 parts), and tributylamine (1.01 parts) is added. The solution becomes cloudy, but is cleared on addition of more dimethylformamide (3.2 parts). It is then chilled to −10° C., and ethyl chloroformate (0.73 part) is added dropwise. The temperature rises to −5° C., and there is a small amount of gas evolution, which soon ceases. The solution is maintained at between −10° and −5° C. for ten minutes, and then, while the solution is in the ice bath, dry ammonia gas is passed in. The temperature rises to about 20° C., and some solids (inorganic ammonium salts) form. The suspension is poured into water, filtered, and the yellow crystals are suspended in 0.1N aqueous sodium hydroxide solution. Very little, if any, of the material appears to dissolve. It is filtered and washed with water, acetone, and ether and air dried to give 1.4 parts (70%) of beta-[1-methyl-4-(1-methyl-4 - nitro - 2 - pyrrolecarboxamido) - 2 - pyrrolecarboxamido]-propionamide, melting at 256°–258° C., with prior shrinking. Several recrystallizations from dimethylformamide-water give, after drying under reduced pressure over phosphorus pentoxide at 100° C. and at room temperature over concentrated sulfuric acid, material melting at 259°–260° C., with decomposition.

EXAMPLE 5

*N-(1-methyl-4-nitro-2-pyrrolylcarbonyl)-dl-alanine*

1-methyl-4-nitropyrrole-2-carboxylic acid (1.1 parts) is allowed to interact with thionyl chloride (11 parts) on the steam bath under reflux for four and one-half hours. The excess thionyl chloride is removed on the steam bath under reduced pressure (water pump) and the residual matter is dissolved in benzene (5.7 parts). This solution is added, during continuous stirring, to a solution of dl-alanine (1 part) and sodium bicarbonate (1.5 parts) in water (11 parts). Vigorous stirring is continued during seventeen hours. At the end of this period, the colorless benzene layer is separated from the yellow aqueous solution. The latter is chilled in an ice-bath and is made acid to Congo Red test paper by addition of dilute sulfuric acid. The solid which precipitates is removed by filtration. After four recrystallizations, with the aid of activated carbon, from alcohol-water, there is obtained a white solid, melting point 153°–155° C.

EXAMPLE 6

*N-[4-(1-methyl-4-nitro-2-pyrrolylcarbonyl)-aminobenzoyl]-beta-alanine*

1-methyl-4-nitro-2-pyrrolecarboxylic acid (3.3 parts) and thionyl chloride (21 parts) are allowed to interact at steam bath temperature during two hours under reflux. The excess thionyl chloride is removed under reduced pressure (water pump) on the steam bath, and the residual material is dissolved in dry benzene (73 parts). This solution is then added, during continuous stirring, to a solution which is obtained by the hydrogenation of N-(para-nitrobenzoyl)-beta-alanine (10 parts), sodium bicarbonate (3.3 parts), a 10% palladium on charcoal catalyst (1 part), and water (125 parts). Vigorous stirring is continued during three hours; at the onset of this period solid begins appearing, and additional sodium bicarbonate (2.1 parts) is added. The resulting emulsion is chilled in an ice bath and is made acid to Congo Red test paper by addition of dilute sulfuric acid solution; the solid which separates is removed by filtration. Four recrystallizations, with the aid of activated carbon, from dimethylformamide-water mixture gives a cream-colored solid, melting point 280°–281.5° C. (decomposition).

Similarly, by reaction of 1-methyl-4-nitropyrrole-2-carboxylic acid chloride with the appropriate aminobenzoyl amino acid, the following compounds are prepared:

(X=1-methyl-4-nitro-2-pyrrolylcarbonyl)
X-NHC$_6$H$_5$CO—epsilon-aminocaproic acid
X-NHC$_6$H$_5$CO—aminomalonic acid
X-NHC$_6$H$_5$CO—isoleucine
X-NHC$_6$H$_5$CO—phenylalanine
X-NHC$_6$H$_5$CO—serine
X-NHC$_6$H$_5$CO—threonine
X-NHC$_6$H$_5$CO—tryptophane
X-NHC$_6$H$_5$CO—valine

EXAMPLE 7

*N-[4-(1-methyl-4-nitro-2-pyrrolylcarbonyl)-amino-1-methyl-2-pyrrolylcarbonyl]-dl-alanine hemihydrate*

1-methyl-4-nitro-2-pyrrolecarboxylic acid (3.3 parts) and thionyl chloride (10 parts) are allowed to interact on the steam bath for two hours under reflux. The excess thionyl chloride is removed under reduced pressure (water pump) on the steam bath. The residual material is taken up in dry benzene (59 parts).

This solution is added during continuous stirring to a solution obtained by the hydrogenation of N-(1-methyl-4-nitro-2-pyrrolylcarbonyl)-dl-alanine (4.5 parts), sodium bicarbonate (1.7 parts), 10% palladium on charcoal (1 part), and water (67 parts). Additional sodium bicarbonate (1.7 parts) is added, and vigorous stirring is maintained during six and one-half hours.

The benzene and aqueous layers are separated, and the aqueous layer is chilled in ice and made acid to Congo Red test paper by addition of dilute sulfuric acid. The deep yellow-colored solid which separates is removed by filtration, and after recrystallization from alcohol-water mixture and three subsequent recrystallizations from dimethylformamide-water mixture, the material is obtained as yellow crystals, melting point 221.5°–222.5° C. (decomposition).

EXAMPLE 8

*N-[4-(1-methyl-4-nitro-2-pyrrolylcarbonyl)-aminobenzoyl]-beta-alanine amide*

To a solution of N-[4-(1-methyl-4-nitro-2-pyrrolylcarbonyl)-aminobenzoyl]-beta-alanine (3.2 parts) in dry dimethylformamide (21 parts) is added tri-n-butylamine (1.7 parts). While being continuously stirred, the resulting solution is chilled to −10° C. Ethyl chlorocarbonate (1 part) is added dropwise, whereupon the temperature rises to −5° C. After the temperature again decreases to −10° C., anhydrous ammonia is passed into the solution during thirty minutes. The resulting mixture is then diluted with water (ca. 60 parts). The solid which separates is removed by filtration and is recrystallized thrice from dimethylformamide-water mixture to give a gray solid, melting point 294.5°–295.5° C. (decomposition).

EXAMPLE 9

*N-[4-(1-methyl-4-nitro-2-pyrrolylcarbonyl)-amino-1-methyl-2-pyrrolylcarbonyl]-dl-alanine amide*

A well stirred solution of tri-n-butylamine (1.7 parts), N-[4-(1-methyl-4-nitro-2-pyrrolylcarbonyl)-amino-1-methyl-2-pyrrolylcarbonyl]-dl-alanine (3.3 parts), and dry dimethylformamide (35 parts) is chilled to 0° C. Ethyl chlorocarbonate (1 part) is added dropwise, whereupon the temperature rises to +3½° C. After the temperature decreases to 0° C., anhydrous ammonia is passed into the solution for fifteen minutes. The resulting mixture is poured into water (ca. 185 parts), and the yellow solid that separates is removed by filtration. Three recrystallizations of this solid from dimethylformamide-water give yellow crystals, melting point 280.5°–282° C. (decomposition) after darkening from 250° C.

EXAMPLE 10

*N-beta-dimethylaminoethyl 1-methyl-4-nitro-2-pyrrolecarboxamide*

Beta-dimethylaminoethylamine (5.5 parts) is carefully added to a benzene solution of 1-methyl-4-nitro-2-pyrrolecarboxylic acid chloride, prepared from the corresponding acid (7 parts). Much heat is evolved, and a white solid forms. The solvent is evaporated under reduced pressure, and the residual solids are dissolved in water. The aqueous solution is made alkaline with sodium hydroxide solution, precipitating a white crystalline solid, which is filtered and air dried to give 6.5 parts of product melting at 65°–68° C. and which is possibly hydrated. Several recrystallizations from benzene and from mixtures of benzene with petroleum ether give N-beta-dimethylaminoethyl-1-methyl-4-nitro-2-pyrrolecarboxamide, melting at 110°–111° C., partially, and completely at 117°–117½° C.

EXAMPLE 11

*1-methyl-4-nitro-2-pyrrolecarboxamide*

Liquefied 1-methyl-4-nitro-2-pyrrolecarboxylic acid chloride, prepared from the corresponding acid (25 parts), is added with vigorous stirring to a concentrated aqueous ammonia solution (200 parts by volume) to give a gray solid. Lumpy material is ground in a mortar with ammonia solution. The product is filtered, washed well with water, and recrystallized from dimethylformamide-water to give 1-methyl-4-nitro-2-pyrrolecarboxamide as a crystalline, cream-colored, fiber-like material (melting point 216°–218° C.) in 90% yield (22.5 parts). Further recrystallization gives amide melting at 218°–219° C.

EXAMPLE 12

*Diethyl N-(1-methyl-4-nitro-2-pyrrolylcarbonyl)-glutamate*

1-methyl-4-nitropyrrole-2-carboxylate (1.0 part) is allowed to reflux with thionyl chloride (8.1 parts) during three hours. The excess thionyl chloride is removed by distillation under reduced pressure on the steam bath, and the residual material is dissolved in benzene (22 parts). This solution is added dropwise during twenty minutes to a continuously stirred, chilled (to 0° C.) solution of diethyl glutamate sulfate (1.3 parts), tri-n-butylamine (1.1 parts), and chloroform (30 parts). The temperature of the solution rises to 7° C. during the addition, and stirring is continued for 2⅔ hours after the addition is completed. The solvent is removed by distillation under reduced pressure on the steam bath, and the residual oil is dissolved in benzene (22 parts). After successively washing the solution with water, sodium bicarbonate solution, hydrochloric acid, and water, the benzene is removed in the usual manner. The residue is dissolved in alcohol (9.9 parts) and chilled at −20° C. overnight. The tan solid that separates is removed by filtration and air dried. Three recrystallizations from ethanol with the aid of activated carbon give white crystals, melting point 111.8°–112.8° C. The combined mother liquors are concentrated on the steam bath in a current of air to give additional product.

EXAMPLE 13

*N-(1-methyl-4-nitro-2-pyrrolylcarbonyl)-glutamic acid*

The product (1 part) described in the previous example is dissolved in acetone (20 parts), water (18 parts), and 37% hydrochloric acid solution (9 parts); the resulting red-orange solution is allowed to reflux on the steam bath for two hours. The solution is then concentrated to a syrupy residue, which is treated with aqueous sodium bicarbonate. Most of the oil dissolves, and the yellow aqueous solution is removed from the residual oil, chilled in an ice bath, and slowly made acid to Congo Red by dropwise addition of dilute hydrochloric acid. An oily material separates; partial crystallization results after repeated trituration with water. In this manner there is obtained N-(1-methyl-4-nitro-2-pyrrolylcarbonyl) glutamic acid.

EXAMPLE 14

*Ethyl N-(1-methyl-4-nitro-2-pyrrolylcarbonyl)-glycinate*

Thionyl chloride (10 parts) and 1-methyl-4-nitropyrrole-2-carboxylic acid (0.8 part) are allowed to reflux on the steam bath during three hours. The excess thionyl chloride is removed by distillation under reduced pressure (water pump), and the residual material is dissolved in dry benzene (35 parts). This solution is added dropwise during one hour to a continuously stirred, previously chilled (to 3° C.) solution of ethyl glycinate hydrochloride (1 part), triethylamine (1.5 parts), and dry chloroform (60 parts). During the initial stages of the addition, the temperature rises to 10° C., but subsequently it lowers to 3° C. After the addition is complete, the mixture is continuously stirred during two additional hours. Filtration of the mixture furnishes white, water-soluble triethylamine hydrochloride. The filtrate is concentrated under reduced pressure to near dryness, and after trituration of the oily residue with water, a pale yellow solid is obtained. Recrystallization of this solid from dilute ethanol, after clarification with activated charcoal, gave white crystals of ethyl N-(1-methyl-4-nitro-2-pyrrolylcarbonyl)-glycinate, melting point 110°–113° C.

EXAMPLE 15

*N-[1-methyl-4-(1-methyl-4-nitro-2-pyrrolylcarbonyl)-amino-2-pyrrolylcarbonyl]-glycine*

A solution of N-(1-methyl-4-nitro-2-pyrrolylcarbonyl)-glycine (5.7 parts) and sodium bicarbonate (2.1 parts) in water (33 parts) is hydrogenated in a Parr low pressure apparatus with 10% palladium on carbon (1 part) as catalyst. The hydrogen uptake is rapid. The warm mixture is filtered to give an aqueous solution of the sodium salt of N-(4-amino-1-methyl-2-pyrrolylcarbonyl)-glycine. Sodium bicarbonate (2.1 parts) is added to this solution. The solution is vigorously stirred, and a benzene (50 parts) solution of 1-methyl-4-nitro-2-pyrrolecarboxylic acid chloride, prepared from 4.3 parts of the acid, is added. Within a few minutes an orange solid forms and stirring is continued during three hours. The mixture is chilled in an ice-bath and made acid to Congo Red test paper by the addition of dilute sulfuric acid solution. The yellow crystals which separate are collected by filtration and recrystallized from dilute dimethylformamide to give yellow crystals, melting point 266.5°–268.0° C. (dec.). An additional recrystallization from dilute dimethylformamide raises the melting point of the yellow crystals to 271°–272° C. (dec.).

EXAMPLE 16

*N-(1-methyl-4-nitro-2-pyrrolylcarbonyl)-glycine*

1-methyl-4-nitro-2-pyrrolecarboxylic acid (2.2 parts) is allowed to interact with thionyl chloride (6.7 parts) on the steam bath until all solid dissolves and hydrogen chloride evolution ceases. The excess thionyl chloride is removed under reduced pressure (water pump) on the steam bath. A solution of the residual matter in benzene (6.7 parts) is continuously stirred with a solution of glycine (1 part) and sodium bicarbonate (2.2 parts) in water (6.7 parts) during nineteen hours. At the end of this period, the bezene layer is separated from the aqueous solution. The latter is chilled in an ice-bath and is made acid to Congo Red test paper by addition of dilute sulfuric acid solution. The solid which precipitates is recrystallized from dilute dimethylformamide to give a cream-colored solid, melting point 176°–178° C.

EXAMPLE 17

*[1-methyl-4-(1-methyl-4-nitro-2-pyrrolecarboxamido)-2-pyrrolecarboxamido]-acetamide*

N - [1-methyl-4-(1-methyl-4-nitro-2-pyrrolylcarbonyl)-amino-2-pyrrolylcarbonyl]-glycine (3 parts) is dissolved in redistilled dimethylformamide (25 parts), and triethylamine (1 part) is added. The solution is chilled to 0° C. while being magnetically stirred, and ethyl chloroformate (1.08 parts) is added dropwise at such a rate that the reaction temperature does not exceed +5° C. When the temperature again lowers to 0° C., dry ammonia gas is introduced. The temperature rapidly rises to +24° C., and some solids form. This mixture is diluted with water (75 parts) and all solids dissolve. The warm solution is chilled in an ice bath, whereupon yellow crystals separate. Recrystallization of the latter from dilute dimethylformamide gives yellow crystals which do not melt below 295° C.

EXAMPLE 18

*1-methyl-4-[(1-methyl-4-nitro-2-pyrrolecarboxamide)-acetamido]-2-pyrrolecarboxamide*

A mixture of 1-methyl-4-nitro-2-pyrrolecarboxamide (3.4 parts) and dimethylformamide (50 parts) is hydrogenated in a Parr low pressure hydrogenation apparatus, using 10% palladium on carbon (1 part) as catalyst. The hydrogen uptake is rapid and about 90% of the theoretical quantity. The mixture is filtered to give a solution of 4-amino-1-methyl-2-pyrrolecarboxamide, which may be used for the preparation of peptide derivatives.

A solution of N-(1-methyl-4-nitro-2-pyrrolylcarbonyl)-glycine (4.6 parts) in redistilled dimethylformamide (25 parts) is chilled to 0° C. during magnetic stirring. Anhydrous triethylamine (2.02 parts) is added. While the temperature of the solution is 0° C., ethyl chloroformate (2.16 parts) is added dropwise. The solution of 4-amino-1-methyl-2-pyrrolecarboxamide, prepared above, is added. Some gas evolution is evident, and the solution is magnetically stirred during two hours at room temperature. At the end of this period, the solution is diluted with water (300 parts) and stored at +3° C. The solid which separates is recrystallized from dilute dimethylformamide to give a pale yellow solid, melting point 213.5°–215.0° C.

EXAMPLE 19

*Dl-1-methyl-4-[α-(1-methyl-4-nitro-2-pyrrolecarboxamido)-propionamido]-2-pyrrolecarboxamide*

A solution of N-(1-methyl-4-nitro-2-pyrrolylcarbonyl)-dl-alanine (3.0 parts) and dry triethylamine (1.2 parts) in redistilled dimethylformamide (13 parts) is chilled to 0° C. during magnetic stirring. Ethyl chloroformate (1.08 parts) is added, and some solid separates. A solution of 4-amino-1-methyl-2-pyrrolecarboxamide, prepared from 2.1 parts of 1-methyl-4-nitro-2-pyrrolecarboxamide, in 25 parts dimethylformamide is added within five minutes. The mixture is permitted to stir forty-five minutes at room temperature. The solvent is removed in vacuo to give a gummy residue, which is washed with 2N sodium hydroxide solution (50 parts), 4% hydrochloric acid solution (50 parts), and water (50 parts). Vigorous scratching the gum induces crystallization. Two recrystallizations of the solid from dilute dimethylformamide give orange crystals, melting point 255°–257° C. with decomposition.

EXAMPLE 20

*1-methyl-4-[β-(1-methyl-4-nitro-2-pyrrolecarboxamido)-propionamido]-2-pyrrolecarboxamide*

A solution of (1-methyl-4-nitro-2-pyrrolyl)-beta-alanine (2.4 parts) and redistilled triethylamine (1 part) in dimethylformamide (30 parts) is chilled to +3° C. during continuous stirring. Isobutyl chloroformate (1.4 parts) is added, and the temperature rises to +7° C. After the mixture has once again cooled to +3° C., a chilled solution of 4-amino-1-methyl-2-pyrrolecarboxamide hemisulfate sesquihydrate (2 parts) and triethylamine (1 part) in water (10 parts) and dimethylformamide (10 parts) is added. A slow but steady evolution of gas bubbles is noted and the temperature rises to 9° C. The orange solution is stirred one hour. At the end of this period the solution is concentrated to ca. one-half volume under reduced pressure (water pump) on the steam bath. The concentrate is diluted with approximately twice as much water. The solid which separates is recrystallized from dilute dimethylformamide to give yellow needles, melting point 246°–248° C.

EXAMPLE 21

*β-(1-methyl-4-nitro-2-pyrrolecarboxamido)-propionamide*

A solution of 2.5 parts of N-(1-methyl-4-nitro-2-pyrrolylcarbonyl)-beta-alanine and 1.0 part of redistilled triethylamine in 12.5 parts of redistilled dimethylformamide is chilled to 0° C. during continuous stirring. To this solution is added 13.7 parts of isobutyl chlorocarbonate at such a rate that the temperature of the reaction remained at 0°–5° C. A precipitate separates at this time. After again chilling the mixture to 0° C., anhydrous ammonia is introduced during thirty minutes. Dilution of the mixture with water and subsequent filtration gives 1.5 parts of near white solid, melting point 249°–254° C. (dec.). Three recrystallizations from dilute dimethylformamide gives fine white needles, melting point 257.5°–259.0° C. (dec.).

EXAMPLE 22

Ethyl 4-nitro-2-pyrrolecarboxylate (100 parts), sodium methylate (31 parts), n-butyl iodide (300 parts), and absolute ethanol (400 parts) are refluxed together for four hours and then allowed to stand at room temperature for three days. The reaction mixture is refrigerated, which causes the product to separate in the form of fine needle-like crystals. These are isolated in the usual way and recrystallized from alcohol to give 66 parts of ethyl 1-n-butyl-2-pyrrolecarboxylate, which has a melting point of 60°–61° C. Evaporation of the mother liquors gives an additional 30 parts of less pure material with a melting point of 58°–59° C.

This ester is hydrolyzed with dilute aqueous alkali to the free acid, and this in turn is converted to 1-n-butyl-4-nitro-2-pyrrolecarboxylic acid chloride.

By procedures similar to those described in the examples above the following compounds are prepared:

Ethyl 1-methyl-4-(1-butyl-4-nitro-2-pyrrolylcarbonyl)-amino-2-pyrollecarboxylate.

Ethyl 1-butyl-4-(1-butyl-4-nitro-2-pyrrolylcarbonyl)-amino-2-pyrollecarboxylate.

N-(1-butyl-4-nitro-2-pyrollylcarbonyl)-beta-alanine.

N - [1 - methyl - 4 - (1 - butyl - 4 - nitro - 2 - pyrrolyl-carbonyl)-amino-2-pyrrolylcarbonyl]-beta-alanine.

N - [1 - butyl - 4 - (1 - butyl - 4 - nitro - 2 - pyrrolyl-carbonyl)-amino-2-pyrrolylcarbonyl]-beta-alanine.

Beta - [1 - methyl - 4 - (1 - butyl - 4 - nitro - 2 - pyrrolecarboxamido)-2-pyrrolecarboxamido]-propionamide.

Beta - [1 - butyl - 4 - (1 - butyl - 4 - nitro - 2 - pyrrolecarboxamido)-2-pyrrolecarboxamido]-propionamide.

N-(1-butyl-4-nitro-2-pyrrolylcarbonyl)-dl-alanine.

N - (1 - butyl - 4 - nitro - 2 - pyrrolylcarbonyl) - amino-benzoyl-beta-alanine.

N - (1 - butyl - 4 - nitro - 2 - pyrrolylcarbonyl) - amino-benzoyl-beta-alanine amide.

Beta-dimethylaminoethyl 1-butyl-4-nitro-2-pyrrolecarboxylate.

N - beta - dimethylaminoethyl - 1 - butyl - 4 - nitro - 2-pyrrolecarboxamide.

We claim:

1. N - (1 - methyl - 4 - nitro - 2 - pyrrolylcarbonyl)-beta-alanine.

2. Beta - [1 - methyl - 4 - (1 - methyl - 4 - nitro - 2-pyrrolecarboxamido) - 2 - pyrrolecarboxamido]propionamide.

3. N - [1 - methyl - 4 - (1 - methyl - 4 - nitro - 2 - pyrrolylcarbonyl)-amino-2-pyrrolylcarbonyl]-beta-alanine.

4. A compound having the general formula

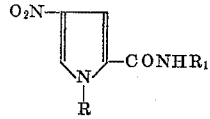

in which R is lower alkyl and $R_1$ is selected from the group consisting of hydrogen, 2-carbamoylpyrrol-4-yl, carbamoylphenyl, omega-amino lower alkyl, carboxy lower alkyl, carbamoyl lower alkyl and carbalkoxy lower alkyl radicals.

5. Ethyl - 1 - methyl - 4(1 - methyl - 4 - nitro - 2 - pyrrolyl-carbonyl)-amino-2-pyrrolecarboxylate.

6. N - beta - dimethylaminoethyl - 1 - methyl - 4-nitro-2-pyrrolecarboxamide.

7. A compound having the formula:

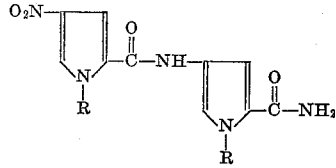

in which R is a lower alkyl radical.

8. A compound having the formula:

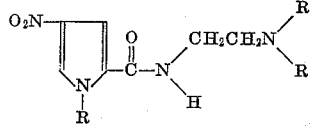

in which R is a lower alkyl radical.

9. A compound having the formula:

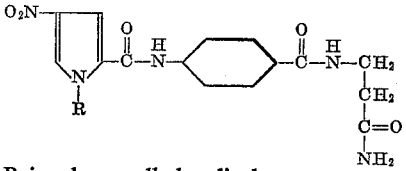

in which R is a lower alkyl radical.

References Cited in the file of this patent

UNITED STATES PATENTS 2,647,120   Williamson _____ July 28, 1953

OTHER REFERENCES

J. Am. Chem. Soc., vol. 47, January 1925, pp. 245–254.
Hale et al.: Chemical Abstracts, vol. 10, p. 50 (1916).
Oddo et al.: Gazz. Chim. Ital., vol. 42 (1912), pp. 244–256, sec. II.
Fischer et al.: Chemical Abstracts, vol. 6, p. 373 (1912).
Fischer et al.: Chemical Abstracts, vol. 25 (1931), p. 961.